United States Patent [19]
Wiessner et al.
[11] Patent Number: 4,618,807
[45] Date of Patent: Oct. 21, 1986

[54] REVERSING CONTACTOR FOR A THREE-PHASE MOTOR

[75] Inventors: Edgar Wiessner, Amberg; Werner Harbauer, Schwandorf; Klaus-Dieter Paul, Sulzbach-Rosenberg, all of Fed. Rep. of Germany

[73] Assignee: Siemens Aktiengesellschaft, Munich and Berlin, Fed. Rep. of Germany

[21] Appl. No.: 723,659

[22] Filed: Apr. 16, 1985

[30] Foreign Application Priority Data

Apr. 19, 1984 [DE] Fed. Rep. of Germany ....... 3415019

[51] Int. Cl.[4] .......................... H02P 1/40; H01H 9/00
[52] U.S. Cl. .................................. 318/280; 200/1 V; 361/77
[58] Field of Search ....................... 318/280; 200/1 V; 335/120, 136, 137; 361/77, 245

[56] References Cited

U.S. PATENT DOCUMENTS 1,616,684 2/1927 Evans ............................. 335/136 X
2,264,993 12/1941 McShane ............................ 318/280
3,504,312 3/1970 Visser et al. ........................ 335/136
3,673,426 6/1972 Weston et al. ................. 200/1 V X
4,357,502 11/1982 Beck .................................. 200/1 V

FOREIGN PATENT DOCUMENTS 2949981 7/1981 Fed. Rep. of Germany ...... 318/280

*Primary Examiner*—William M. Shoop, Jr.
*Assistant Examiner*—Bentsu Ro
*Attorney, Agent, or Firm*—F. W. Powers; J. L. James

[57] ABSTRACT

This invention pertains to a three-phase reversing contactor with fixed-mounted contact parts serving the input and the output, and a connection by contact bridges from the input to the output. A common drive mechanism is provided for all the contact bridges, and a shift mechanism to change the configuration of the contact bridges, while in the OPEN position, relative to the fixed-mounted contact parts is also provided. Through the application of the two independently movable contact bridge carriers, which by use of an auxiliary magnet can be selectively brought into functional contact with the common drive mechanism by a reversing yoke, the drive output for the auxiliary magnets can be kept low. As there is a fixed configuration of contact bridges to the fixed-mounted contact parts, the major wiring work can be performed in the shop by the use of correspondingly formed fixed-mounted contact parts.

7 Claims, 21 Drawing Figures

REVERSING CONTACTOR FOR A THREE-PHASE MOTOR

BACKGROUND OF THE INVENTION

This invention relates to the field of three-phase contactors and more particularly to such contactors for use with electric motors which provide for the reversing of rotational direction from right to left or from left to right, having fixed-mounted contact parts serving the input and output lines, contact bridges connecting the input and output lines, equipped with a drive, and a positioning mechanism to shift the input and output lines between configurations with respect to another.

In a known reversing contactor disclosed in DE-OS 23 14 597, an additional rotary drive for the contactor bridges, which can be driven by a toothed rack, is provided. Such a contactor represents a relatively complicated design incurring high material costs and high assembly costs during manufacture.

It is an object of this invention to simplify substantially the known reversing contactor in terms of design and expense.

SUMMARY OF THE INVENTION

Briefly stated, in accordance with the invention, the foregoing objects are achieved in a simple fashion by providing contact bridges which are held grouped in place in two separate contact bridge carriers and which can be selectively coupled to a drive mechanism by a positioning mechanism. The activation of the positioning mechanism requires only slight activating forces. A further advantage of this invention is that the drive mechanism does not have to accelerate unnecessarily large masses.

In another aspect of the invention, the positioning mechanism is constructed of a yoke which can be reversed by use of an auxiliary magnet and is connected in a rotating fashion to the switching magnet whose free end can mesh selectively with the parallel-aligned, shiftable, contact bridge carriers, then this positioning mechanism only needs to rotate the reversing yoke which has a relatively low mass since the switch-over must take place while the contactor is off. To prevent any actuation of the individual contact bridge carriers when the reversing yoke is not in the above-described position, it is advantageous to provide locking lugs on the contact bridge carriers which mesh with the cutouts in a locking bar, shiftable by the reversing yoke. The locking bar has the additional advantage that the reversing yoke is forced back into its rest position when the auxiliary magnet is not energized. Additionally, in order to permit an electrical interlock it is further advantageous if the locking bar has an integral auxiliary contact. Manual actuation of the positioning mechanism and also external indication of this position can be attained if the locking bar has an extension protruding beyond the outer body of the contactor.

In a further aspect of the invention, the relatively high assembly costs incurred during installation or prewiring of the reversing contactor is reduced if fixed-mounted contact parts are bridged within the contactor housing, and only one terminal provided per line connection which is accessible from the exterior of the contactor housing. The wiring expense is further reduced by having a lock-type NOC (normally open contact) actuated by the drive independently of the positioning mechanism connected at one end of the left and right-turning common output line within the contactor and having its other side to a connecting terminal accessible from the exterior of the contactor housing. The wiring expense is further reduced and lesser actuation forces required for the positioning mechanism when reciprocal interlocking contacts are connected within the contactor before the connecting terminals for right and left rotation.

BRIEF DESCRIPTION OF THE DRAWING

While the specification concludes with claims particularly pointing out and distinctly claiming the subject matter which is regarded as the invention, it is believed that the invention will be better understood from the following description of the preferred embodiment taken in conjunction with the accompanying drawings in which:

DESCRIPTION OF THE PREFERRED EMBODIMENT

Figure 1:
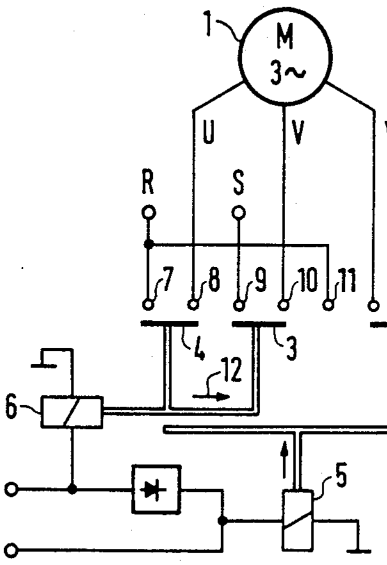
FIG. 1 is a schematic diagram of the reversing contactor for left rotation connected to a three-phase motor.
Figure 2:
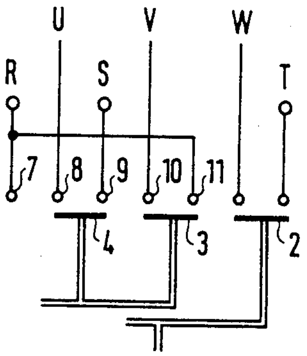
FIG. 2 is a simplified schematic diagram showing a contact position for right rotation.

In the schematic according to FIG. 1, motor 1 with connection U, V, W is connected through bridges 2, 3 and 4 to phases T, S, R. The switching force is generated by the switching magnet 5. The positioning of the contact bridges 3 and 4 is performed by magnetic drive 6. The fixed-mounted contact parts which are essential for the generic invention, are designated by reference symbols 7 to 11. In the position shown in FIG. 1, the fixed-mounted contact parts 7, 8 are bridged by contact bridge 4 and the fixed-mounted contact parts 9 and 10 by contact bridge 3, i.e., connection U of motor 1 are connected to phase R, and connection V of motor 1 is connected to phase S of the switch input. If magnet drive 6 is electrically energized, then the contact bridges are shifted in the direction shown by arrow 12 so that the fixed-mounted contact parts 8, 9 are bridged by contact bridge 4 and the fixed-mounted contact parts 10, 11 are bridged by contact bridge 3 so that connection U of the motor passes through to phase S, and connection V of the motor through to phase R. The only wiring cost is the bridge from the fixed-mounted contact parts 7 to the fixed-mounted contact part 11. The arrangement for right rotation of the bridges in reference to the fixed-mounted contact parts can be seen in FIG. 2.

Figure 3:
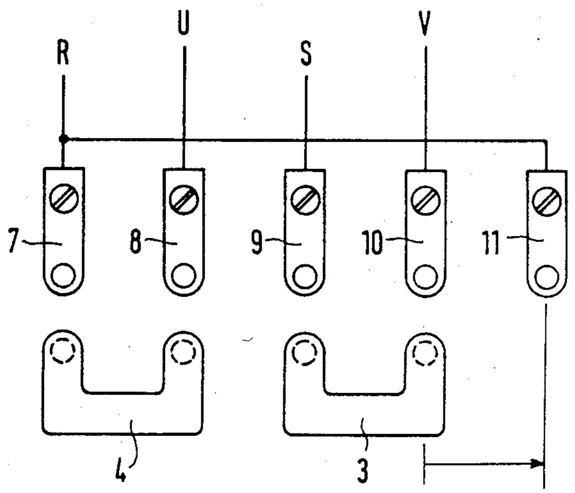
FIG. 3 is a plan view schematical depicting five adjoining, fixed-mounted contact parts with the corresponding U-shaped contact bridges.
Figure 4:
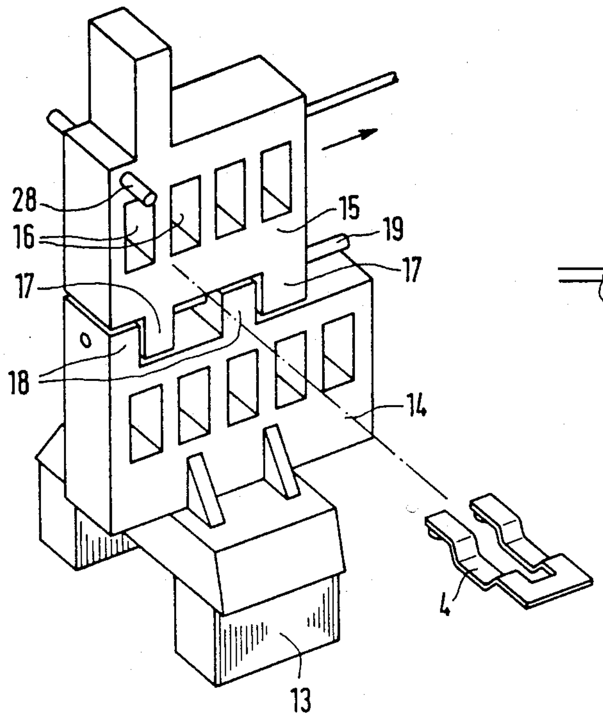
FIG. 4 is a diagrammatic view of the contact bridge carriers showing contact bridges and armature.
Figure 5:
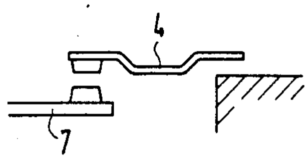
FIG. 5 illustrates the support for the movable U-shaped contact bridge.
Figure 6:
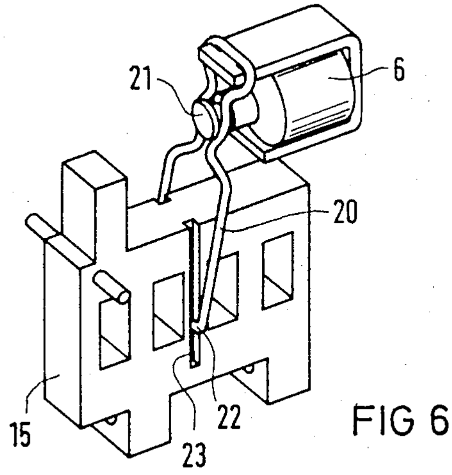
FIG. 6 depicts schematically a possible type of connection of the magnetic drive for the positioning mechanism.

FIG. 3 shows a contemplated embodiment having bridges 3 and 4 as U-shaped contact bridges with the fixed-mounted contact parts 7 through 11. In this design the fixed-mounted contact parts 7 to 11 correspond to the normal fixed-mounted contact parts of five adjoining individual contacts of a standard contactor. Only the contact bridge carrier has been modified as shown in FIG. 4. Part 14 of the contact bridge carrier connected to the armature 13 bears the movable part 15 in whose cutouts 16 contact bridges 3 and 4, respectively are held in place with the legs of the U in the normal fashion using contact pressure springs. The forks 17, 18 and a slide pin 19 control the movable mount. The prongs of forks 17, 18 at the same time provide the stops for the movable mount. The movable coupling of the movable part 15 to magnetic drive 6 can be seen in FIG. 6. This is handled by a spring member 20 which meshes at one end with the armature 21 of the magnetic drive 6 and at the other end with the ends 22 in a keyway 23 of the movable part 15 in order to thereby bring about movement.

Figure 7:
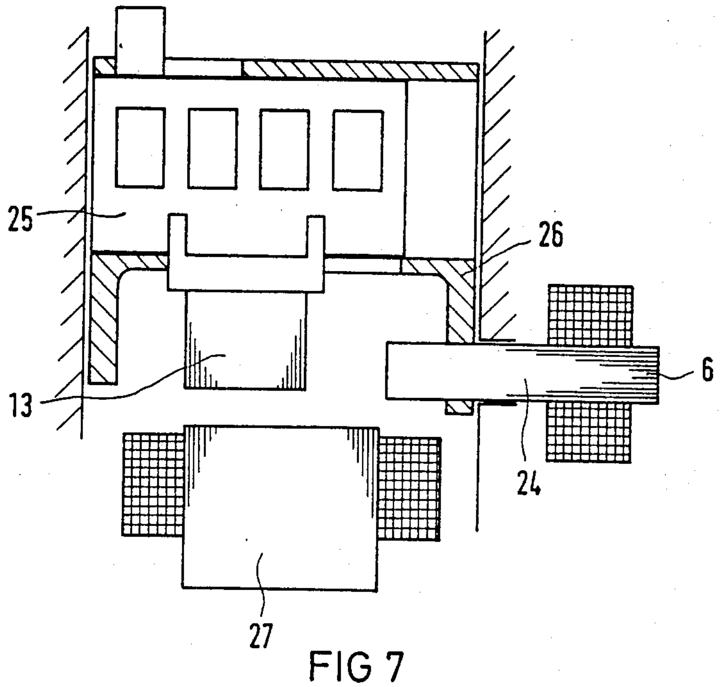
FIG. 7 shows an embodiment wherein the armature is shifted between positions by the auxiliary magnet.
Figure 8:
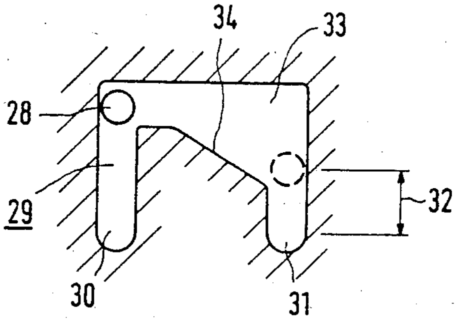
FIG. 8 shows a connecting member for the alignment pin which prevents switch-on of the magnet and thus of the contactor between the two rotation configurations.

In the embodiment shown in FIG. 7 the entire armature 13 is shifted sideways by the core 24 of the magnetic drive 6 with the contact bridge carrier 25. The shift is provided for by alignment case 26 for the transverse motion. The motion is limited in such a fashion that armature 13 does not make contact with core 24. In ordr to have the complete switching capability available, core 27 of switching magnet 5 is wider than armature 13. To prevent the contact bridges 3, 4 from making contact with the fixed-mounted contact parts 7 through 11 during transit positions when switching on the switching magnet, an alignment pin 28, shown in FIG. 8, is mounted in the movable part 15 of the contact bridge carrier for a mechanical interlock with the pin, penetrating into one connecting member 29 of the contactor housing. The connecting member has the U-shape as seen in FIG. 8 with the legs or end sectors 30, 31 and the oblique surface 34, with the length 32 of the end sector 31 being greater than the NOC penetration pressure. Depending upon the time factor between the transverse motion, i.e. start-up of the positioning mechanism by magnetic drive 6 and initiation of the switching motion, i.e. electrically energizing the switching magnet 5 due to the tolerances, temperature, varying accelerations, etc., the free area designated as 33 in the connecting member through which aligning pin 28 is passed. Thereby the switching time is reduced. The end sector 30 corresponds to the right rotating position of the contact bridges in accordance with FIG. 1. End sector 31 corresponds to the left rotating position as can be seen from FIG. 2, i.e., when magnetic drive 6 is switched on.

Figure 9:
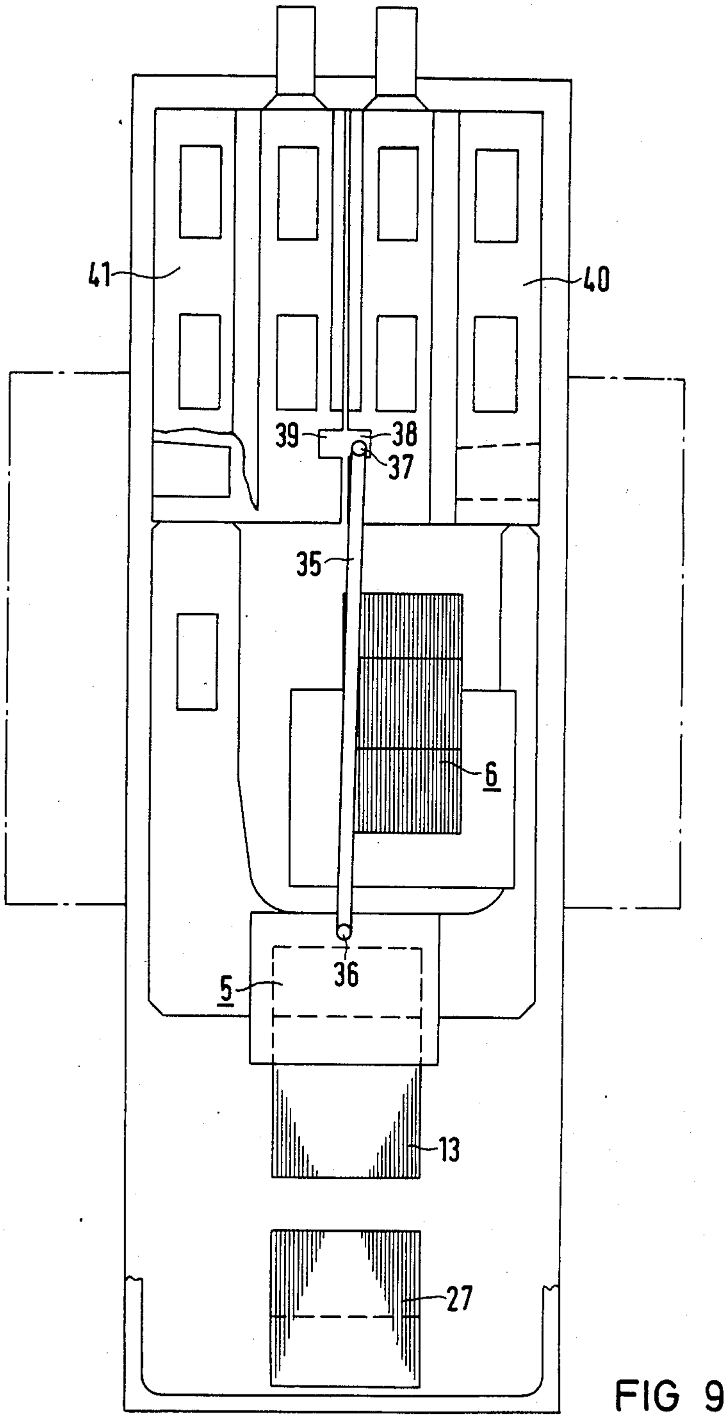
FIG. 9 is a diagrammatic view of an embodiment with two parallel, adjacent contact bridge carriers, wherein the reversing yoke meshes parallel to the longitudinal axis of the contact bridges at the contact bridge carrier.

In the embodiment shown in FIG. 9, a wire-formed reversing yoke 35 having one end 36 is movably connected to the common drive 5 which is comparable to the switching magnet in standard contactors. Free end 37 can selectively slide into a cutout 38 or 39 in two separately movable contact bridge carriers 40 or 41 aligned within the housing. The positioning mechanism handles that task with magnetic drive 6 functioning as the auxiliary magnet.

Figure 10:
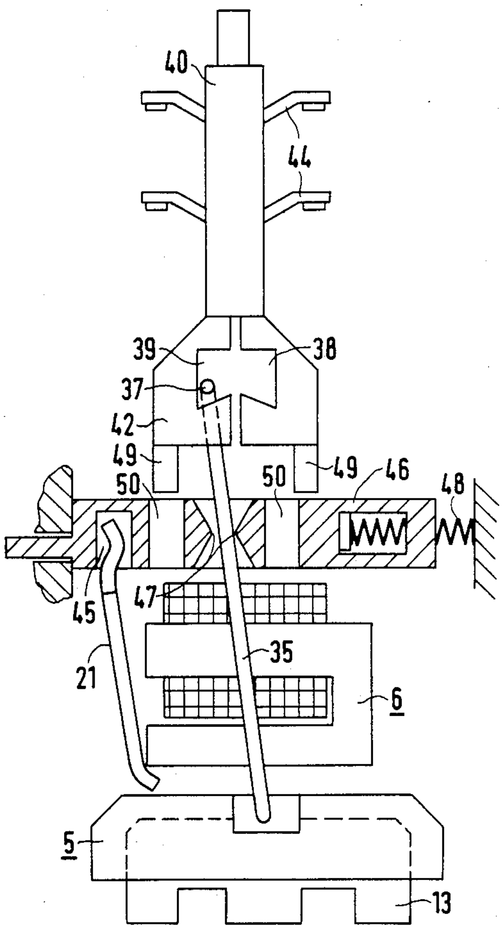
FIG. 10 is a frontal diagrammatic view of another embodiment wherein the reversing yoke meshes at an angle offset by 90 degrees to the contact bridge longitudinal axis.
Figure 11:
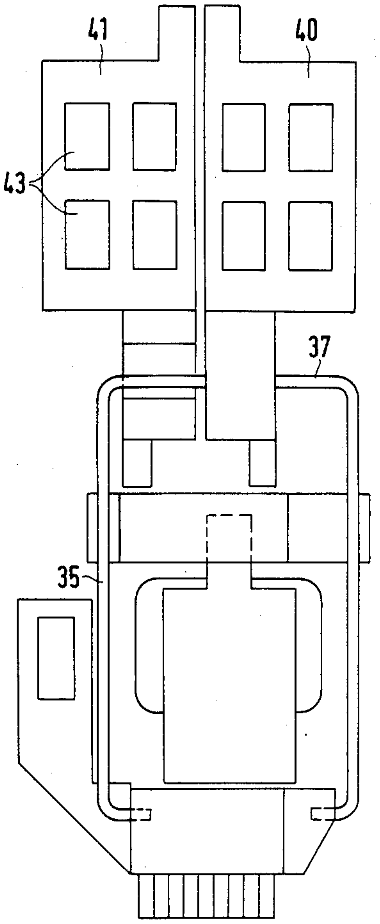
FIG. 11 is a side diagrammatic view of the embodiment shown in FIG. 10.
Figure 12:
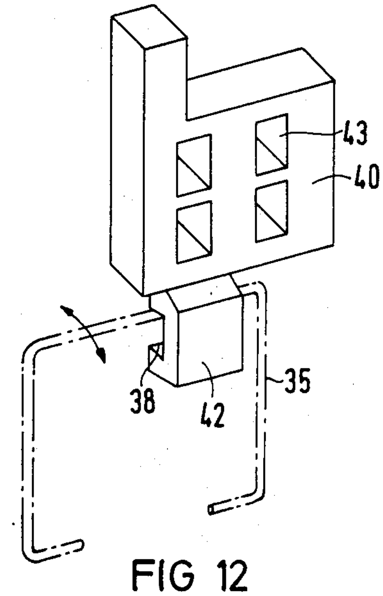
FIG. 12 is a partial perspective view of one of the two identical contact bridge carriers shown in FIGS. 10 and 11.

In the embodiment shown in FIGS. 10 and 11 the contact bridge carriers 40 and 41 are equipped with extensions 42 into which the cutouts 38 or 39 are incorporated. The contact bridge carrier shown in FIG. 12 is the one shown on the right hand side of FIG. 11. The left contact bridge carrier 41 is inserted at a 180-degree rotated alignment so that both extensions 42 are more or less facing each other and enclose between them cutouts 38, 39. Free end 37 of the reversing yoke 35 is captured in these cutouts. Each of the contact bridge carriers has four access slots 43 in this embodiment, wherein the contact bridges 44 with the non-depicted contact pressure springs are housed in a standard fashion. The access slots 43 are positioned in pairs beside and above each other. By designing the reversing yoke 35 as a wire yoke, it is possible to align the magnetic drive 6 between the switching magnet 5 and the contact bridge carriers 40, 41. The armature 21 of the magnetic drive 6 meshes with a cutout 45 of a locking bar 46, which is movable and can reset the reversing yoke 35 into both end positions using the carriers 47. The end position shown in FIG. 10 is attained by the counter-pressure spring 48 which meshes with the movably aligned locking bar 46. This predetermined positioning is always maintained when magnetic drive 6 is not excited. If armature 13 is drawn down towards the not depicted core 27 by electrically charging the switching magnet 5, then contact bridge carrier 41 is carried along towards switch-on via the reversing yoke 35. The contact bridges 44 thereby come in contact with the stationary contact parts, as will be further elaborated below. Thereby, a locking lug 49 on extension 42 mates with a blocking cutout 50 in the locking bar 46 so that any motion of the locking bar 46 by magnetic drive 6 is excluded. If magnetic drive 6 is electrically energized, then the locking bar 46 shifts counter to the force of spring 48 until the free end 37 of the reversing yoke 35 meshes with cutout 38 and locking lug 49 of the other contact support 41 mates with the other locking cutout 50 in locking bar 46. If then switching magnet 5 is activated, contact bridge carrier 41 is attracted and the corresponding contacts—to be further explained below—are established.

Figure 13:
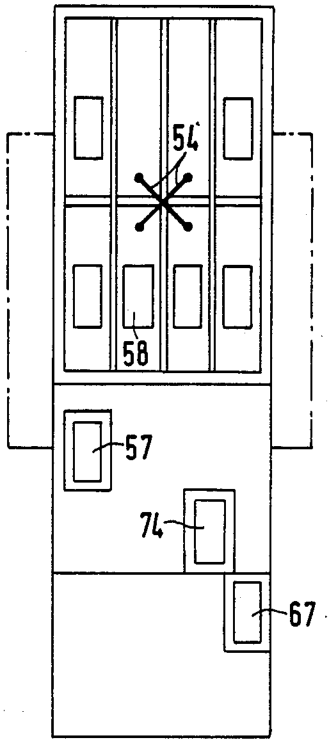
FIG. 13 is a bottom view of an exterior housing of a contactor reflecting an installation of a given contactor.
Figure 14:
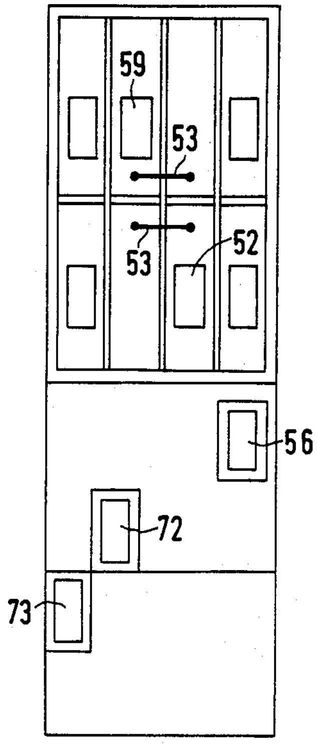
FIG. 14 is a top view of the exterior housing of the contactor in FIG. 13.
Figure 15:
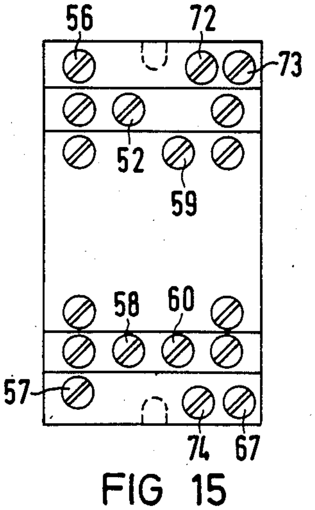
FIG. 15 is a frontal view showing connecting terminals of the exterior housing of the contactor in FIGS. 13 and 14.
Figure 16:
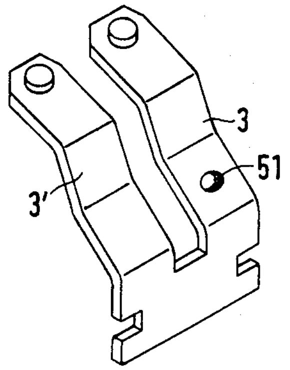
FIG. 16 is a perspective view of a dual fixed contact piece on the lower level showing an eyelet for a connector bolt accessible from the exterior of the contactor housing.
Figure 17:
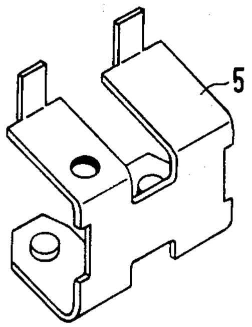
FIG. 17 is a perspective view of a dual fixed contact piece of the upper level.
Figure 18:
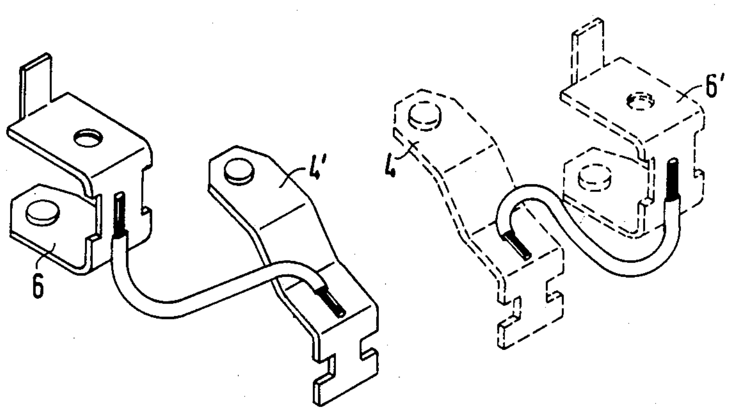
FIG. 18 is a perspective view of a fixed contact piece combination for a cross-connection over various levels, shown by broken lines is a combination for an optional positioning of the connector bolt.

As FIGS. 13 through 15 show, not every contact bridge is allocated a connecting terminal on the facing sides of the contactor. Rather, only the necessary main terminals and, if necessary, usable auxiliary switch terminals are routed to the outside. The terminals are indicated by a square and can be seen in FIG. 15 as a screw-in connection. FIG. 16, for example, depicts the fixed dual contact piece of the middle fixed contact part of the lower level in accordance with FIG. 14. The square depicted opens eyelet 51, for example, or the combination connecting screw 52. FIG. 17 depicts the dual fixed contact piece of the two middle contact locations of the upper level. Bridging of the fixed contact pieces in the manner shown is indicated by the lines 53. The lines 54 in FIG. 13 show the internal cross-over wiring between the fixed contact pieces on two levels. Here the contact piece combination, as shown in FIG. 18, is utilized. As can be seen here as well, connector terminals are only present in the lower level.

Figure 20:
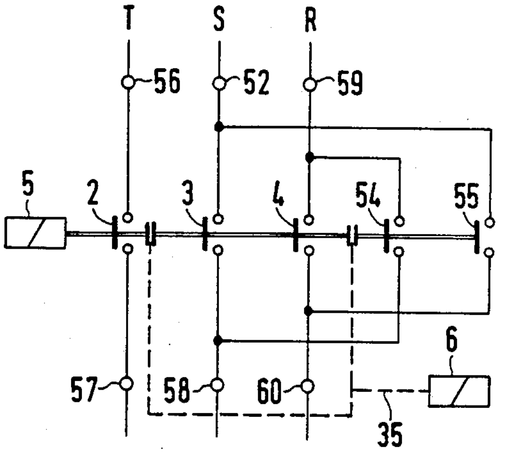
FIG. 20 is a wiring schematic for the main current circuit using the compact reversing contactor.
Figure 21:
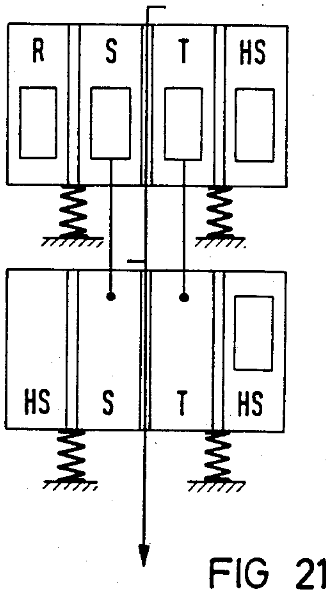
FIG. 21 depicts an embodiment with two sequential contact bridge carriers (in reference to the contactor installation position) and a common drive.

To determine the individual contact bridges or terminal connections corresponding to the respective input and output line, please refer to FIG. 20. The non-reversible contact bridge 2 in this instance is positioned at phase T (see also FIGS. 1 and 2). Independently of the reversing yoke 35, the contact bridge is brought into functional connection with the switching magnet 5 so that the terminals designated 56 and 57 in the lower portion of the reversing contactor are electrically connected. The contact bridges 3 and 4 are positioned in the two interior access slots of the contact bridge carrier 41 laying one upon the other in two levels, i.e., facing the other contact bridge carrier. The contact bridges 54, 55 mounted in adjacent slots of the contact bridge carrier 40 which can be independently moved, are in the above-described manner completely interlocked. The input line or connecting terminal for the fixed contact parts in reference to contact bridge 3 or 55 is designated by number 52. The corresponding output line, which was also bridged as described above in greater detail, is designated 58 as the connector terminal. The connector terminal for the common input line for contact bridges 4 and 54, which was also bridged in the above-described fashion, is designated 59, and the joint output line is designated 60 as the connctor terminal. No designation was given to the connecting terminals for the external auxiliary contact circuits.

Figure 19:
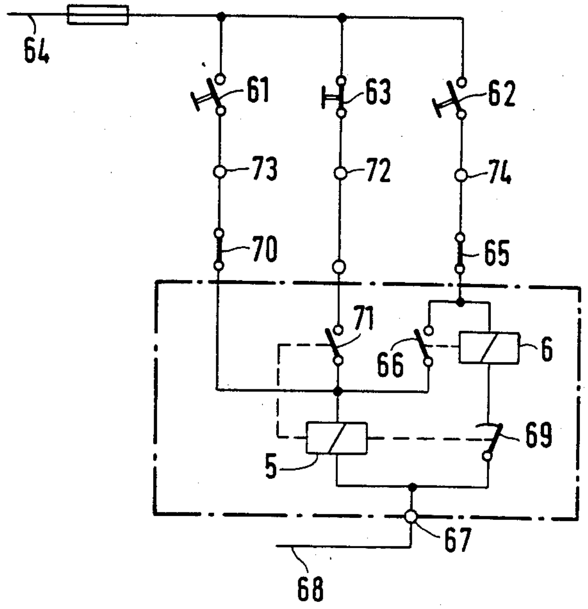
FIG. 19 is a schematic showing the control of the reversing contactor.

The control with the corresponding interior wiring can be seen in FIG. 19. The on-switch or on-key for the right rotation is designated 61, and the one for left rotation is designated 62. The off-key 63 designed as a normally closed contact (NCC) is positioned with both on-keys at the input line 64. The left on-key 62 is connected at its other end over an interlock NCC 65 to the coil of magnetic drive 6 and to an NOC 66 actuated by the magnetic drive; this NOC connects the core of switching magnet 5 via terminal 67 to the output line 68 of the power system. The coil of the magnetic drive 6 is connected by a self-cleaning contact 69 to terminal 67 which is required as long as the coil for magnetic drive 6 is not sized for 100% switch-on duration. The self-cleaning contact 69 is actuated by the switching magnet 5. The end of the coil for a switching magnet 5 facing the input line is connected on the one side with the other end of the NOC contact 66, with the one end of the interlocking contact 70 opposing the interlocking NCC contact 65, and with a self-locking contact 71 activated by the switching magnet 5. The other end of the self-locking contact 71 is connected to terminal 72 of the reversing contactor so that it can be brought into contact with the off-key 63. The connector terminals passing to the outside, which ought to be connected to the on-key 61 or on-key 62, are identified as 73 and 74.

It is clear based on FIG. 9 in conjunction with FIGS. 13 and 15 that the reversing contactor in accordance with this invention can be installed with very little assembly labor when connecting the contactor, since the internal wiring can be handled in the shop which, given mechanized fabrication, is substantially more cost-effective than on-site wiring.

As will be evident from the foregoing description, certain aspects of the invention are not limited to the particular details of the examples illustrated, and it is therefore contemplated that other modifications or applications will occur to those skilled in the art. It is accordingly intended that the claims shall cover all such modifications and applications as do not depart from the true spirit and script of the invention.

What is claimed as new and desired to be secured by Letters Patent of the United States is:

1. A three-phase, reversing contactor for use with an electric machine with a housing, fixed-mounted contact parts for input and output power lines and contact bridges connecting the input and output lines, having a common drive mechanism and a positioning mechanism for switching the flow of current between the input and output lines to another configuration, comprising;

two separate movable contact bridge carriers aligned in parallel to one another providing mounting in place in a grouped fashion for said contact bridges, coupled alternatively and selectably by said positioning mechanism to said drive mechanism;

said positioning mechanism having a reversing yoke moveable by means of an auxiliary magnet connected to a switching magnet, and said yoke having a free end providing a selectable mechanical coupling to said parallel aligned movable contact bridge carriers.

2. A reversing contactor according to claim 1, further comprising:

a locking bar responsive to said reversing yoke having cutouts therein; and at least one locking lug attached to each of said contact bridge carriers which selectably mate with said cutouts in said locking bar.

3. A reversing contactor according to claim 2, further comprising:

an auxiliary contact arrangement connected to said locking bar.

4. A reversing contactor according to claim 2, wherein an extension of said locking bar projects beyond the outer contours of said reversing contactor.

5. A reversing contactor according to claim 3, wherein an extension of said locking bar projects beyond the outer contours of said reversing contactor.

6. A three-phase, reversing contactor for use with an electric machine with a housing, fixed-mounted contact parts for input and output power lines and contact bridges connecting the input and output lines, having a common drive mechanism and a positioning mechanism for switching the flow of current between the input and output lines to another configuration, comprising;

two separate movable contact bridge carriers aligned in parallel to one another providing mounting in place in a grouped fashion for said contact bridges, coupled alternatively and selectably by said positioning mechanism to said drive mechanism;

a common output line as a part of said reversing contactor electrically connected to a common input line whether switched into left or right rotation configuration; and a self-locking NOC contact actuated by said drive mechanism independently of said positioning mechanism connected to one end of said common output line and the other end of the NOC contact is connected to a connector terminal accessible from the outside of said housing.

7. A reversing contactor according to claim 6, further comprising:

reciprocal interlocking contacts electrically connected between said input lines and the connection terminals for right or left rotation within said contactor.

* * * * *